US006323957B1

(12) United States Patent
Ball

(10) Patent No.: US 6,323,957 B1
(45) Date of Patent: Nov. 27, 2001

(54) BACKGROUND NOISE REMOVAL FOR A LOW-COST DIGITAL COLOR COPIER

(75) Inventor: James L. Ball, San Carlos, CA (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/088,099

(22) Filed: Jun. 1, 1998

(51) Int. Cl.[7] ............................ H04N 1/409; G06K 9/40; G06K 9/46; G06T 5/40

(52) U.S. Cl. ........................... 358/1.9; 358/522; 358/530; 358/463; 358/464; 382/171; 382/228; 382/275

(58) Field of Search ............................ 358/1.9, 518, 522, 358/530, 537, 538, 452, 453, 463, 464, 461; 382/274, 275, 260, 171, 172, 168, 228

(56) References Cited

U.S. PATENT DOCUMENTS

| | | | | |
|---|---|---|---|---|
| 5,282,061 | * | 1/1994 | Farrell | 358/464 |
| 5,317,420 | * | 5/1994 | Kuwahara | 358/463 |
| 5,329,382 | * | 7/1994 | Mita | 358/463 |
| 5,396,346 | | 3/1995 | Nakayama et al. . | |
| 5,400,053 | | 3/1995 | Johary et al. . | |
| 5,469,276 | | 11/1995 | Shu . | |
| 5,543,941 | | 8/1996 | Parker et al. . | |
| 5,689,590 | * | 11/1997 | Shirasawa et al. | 358/518 |
| 5,699,454 | * | 12/1997 | Nakai et al. | 382/172 |
| 5,706,368 | * | 1/1998 | Mita | 358/538 |
| 5,708,518 | | 1/1998 | Parker et al. . | |
| 5,725,988 | | 3/1998 | Platzer . | |
| 5,726,772 | | 3/1998 | Parker et al. . | |
| 5,850,298 | * | 12/1998 | Narahara et al. | 358/518 |

* cited by examiner

*Primary Examiner*—Scott Rogers
(74) *Attorney, Agent, or Firm*—Fay, Sharpe, Fagan, Minnich & McKee, LLP

(57) ABSTRACT

Provided is a system for eliminating background noise, i.e. unwanted dots of ink in the background of a document which is to be reproduced by a copier. An STS module collects statistics on a stream of pixels representing an original document generated by a scanner of the copier. The statistics are used by an MIC module to determine a reference background color value of the scanned document. The reference background color value and pixel values of pixels included in the pixel stream are compared by an RTE module and the results of comparison are used to adjust, when necessary, the pixel values remove the undesirable background noise.

17 Claims, 10 Drawing Sheets

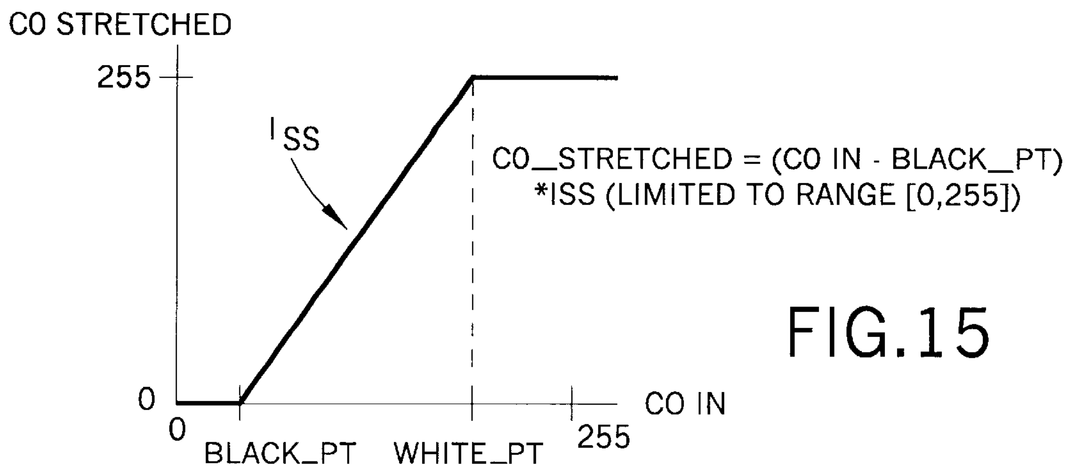
FIG.15
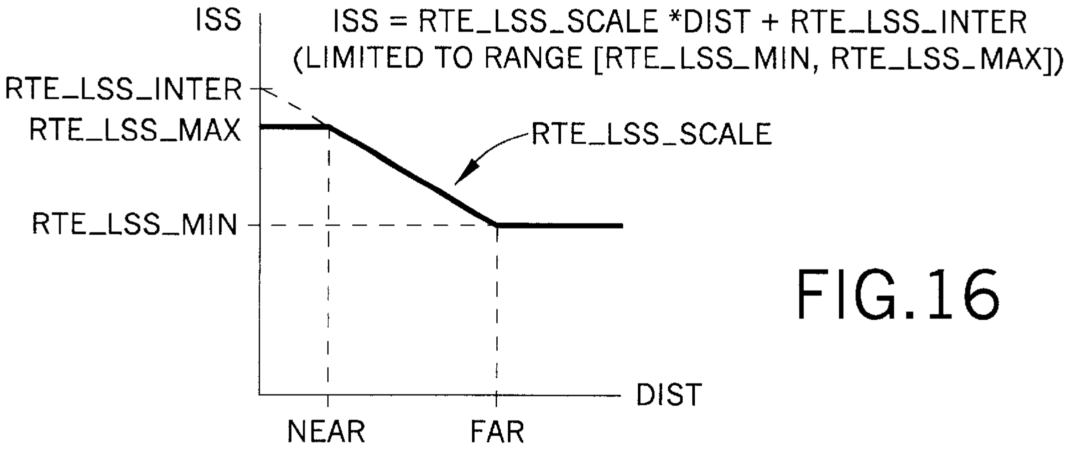
FIG.16
FIG.17
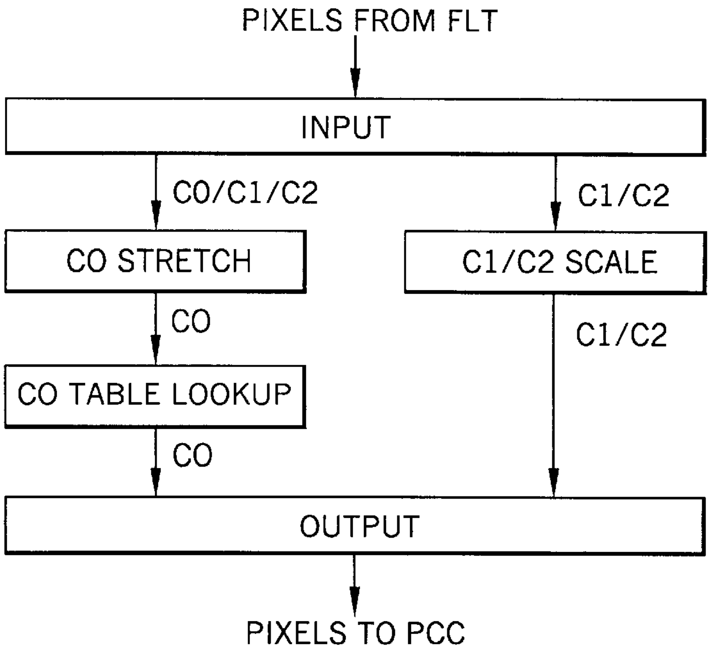

BACKGROUND NOISE REMOVAL FOR A LOW-COST DIGITAL COLOR COPIER

BACKGROUND OF THE INVENTION

The present invention relates to document reproduction and more particularly to the removal of undesirable and unintended dots of toner or ink produced in a background area of a document. As will be detailed below, the primary use of the present invention is in connection with marking engines used in digital black/white and color copiers and printers. However, it is to be appreciated that the present invention can have uses in other fields where noise removed is beneficial.

FIG. 1 illustrates the image path of a color digital copier A, including scanner 10, image processing electronics 12 and printer 14. An original document is scanned by scanner 10, and converted into a stream of pixels. Image processing electronics 12 manipulates the pixel stream into a format suitable for use by printer 14, which selectively transfers toner or ink to a blank piece of copy paper, commonly a white piece of paper, thereby reproducing the images of the original document onto the copy paper.

Each scanned pixel is represented by three 8-bit values 20 that measure the intensity of the three primary colors (i.e. red, green and blue), such a representation being in what is known in the art as a 24-bit RGB color space. Black is represented by all three values of RGB being equal to 0, white is represented by all three values being equal to the maximum 8-bit value 255, and gray is represented by all three values being an equal value. In existing color digital copiers, the printer functions in a non-RGB color space which more closely mimics the human eye. Examples of such color spaces include CMYK, YCC, and LAB color spaces, the concepts of which are well known in the art. The whitest pixel produced by a CMYK printer consists of no toner or ink located at that pixel position. Therefore, the whitest pixel is limited by the whiteness of the copy paper.

FIG. 2 graphically represents the RGB color space where each pixel is represented by three 8-bit values (0–255). If a user wishes to increase or decrease the luminance of an output document, it is necessary to adjust each of the colors of the RGB color space by an equal amount such that the color of the pixels do not change, but rather only the luminance is altered.

On the other hand as can be seen in FIG. 3, which is a graphical representation of a color space such as YCC (where C0=the intensity value and C1 and C2 represent the hue of a color), intensity can be altered by changing the value of C0 without requiring a corresponding change to the C1 or C2 values. With attention to the C1 and C2 values of FIG. 3, the further away from the origin, the more saturated the color value (i.e. the deeper the hue). Also, if the C0 value is set to 0, then the values of. C1, C2 are irrelevant since the color will be black. Similarly, if the C0 value is made equal to its maximum, i.e. 255, then it does not matter what the values of C1, C2 are since the color will be pure-white.

Thus, by moving from the RGB color space to a color space more closely mimicking the human eye, such as the YCC or LAB color spaces, it is easier to control the luminance and hues of the documents being reproduced.

In order for scanners which scan images into the RGB color space and printers which operate in color spaces, such as CMYK, to function together in the same copier, a color space conversion takes place through the use of color space converter 16, whereby over 16 million colors in the RGB color space ($2^{24}$) are converted to the 16 million colors of the YCC or LAB color space ($2^{24}$). Thereafter, the pixels are provided to render 18 which converts the 16 million colors in the YCC color space to the 16 colors of the CMYK color space ($2^4$) and then passes the pixels to printer 14. FIG. 1 also shows microcontroller 19, which provides intelligence to control operation of color digital copier A.

Another consideration regarding digital color copiers is that existing color marking engines (e.g. laser and ink jet) cannot satisfactorily reproduce extremely unsaturated colors (known as near-white). The resulting reproduction consists of a few widely scattered small dots of color (i.e. background noise), in the background of the copy paper. The term background refers to the region of the source document that has no image imposed on it so that the underlying paper is viewed. Common background types are white copy paper, colored copy paper, newspaper, magazine paper and photographs.

When the background of the source document is scanned, even if the paper appears white to a person, it appears off-white i.e. near-white, to a scanner. This off-white color is an extremely unsaturated color, hence the perceptually white background of the original is reproduced with colored dots scattered around the page. Viewed at a far distance, the region looks like the near-white original color but at a typical viewing distance the dots are quite noticeable and objectionable.

These near-white pixels are created by the combination of scanner inaccuracies, source document paper inconsistencies, and actual near-white pixels in the source document.

To overcome the above, the present invention provides a system that removes the undesirable background noise, in the form of unwanted dots of color, located in a background area of a document.

SUMMARY OF THE INVENTION

In accordance with one aspect of the present invention, provided is a system which eliminates background noise from a document to be reproduced. The system includes a device for acquiring statistics for at least some pixels of a pixel stream generated by a document scanner. Statistics and characteristics of the document are extracted from the pixels to determine a background color of the document to be reproduced. The value of the determined background color is then compared with incoming pixels of the scanned document to determine color dispersion in the background. Pixels found to be "near" background color values are manipulated to become pure-white by changing the luminance to maximum, pixels found to be "far" from the background color values are left unchanged, and pixels between "near" and "far" are altered in a linear manner. The manipulated pixels are then forwarded to a printer whereby a document is printed which has eliminated undesirable background dots, i.e. noise, within a document.

The present invention may be used in a digital color copier as well as black and white copiers wherein the system includes a statistics gathering (STS) module which acquires statistics on the pixels scanned by a scanner. The pixels are then provided to a controller MIC module which manipulates the statistics to determine background color values. These background color values along with additional statistics define areas where a pixel will be changed to white, where a pixel will not be changed, and where a pixel will be changed linearly.

In a more limited aspect of the present invention, a reference background value and a value of an incoming pixel are compared to determine the color distance the incoming pixel is located from the background reference value.

The RTE module accepts a pixel stream from the scanner and performs a transform. This transform is used to remove background noise. The RTE determines the three dimensional color distance squared between each incoming pixel and a reference pixel (supplied by the MIC module). The RTE module applies a linear stretch to a C0 value of each pixel. Pixels with a color "near" to the reference pixel are stretched so that the C0 component becomes pure-white. Pixels with a color "far" from the reference pixel are not changed. In a transition region between the "near" and "far", pixels are stretched in a linear fashion.

In accordance with a more limited aspect of the present invention, the regions of transition are defined by an inner three dimensional ellipse and an outer three dimensional ellipse formed around a center reference point.

In accordance with another feature of the invention, a color digital copier implements the present invention wherein pixels scanned into an RGB color space are converted into a YCC or LAB color space where after undesirable background noise is eliminated.

In accordance with another aspect of the present invention, the elimination of undesirable background noise is performed in real time, whereby the pixels are manipulated during a single pass of the document such that the ability to eliminate undesirable background noise does not lower the throughput of the digital copier.

In accordance with still another aspect of the invention, when a background color value is not capable of being determined, the present invention includes a default background reference color to which the incoming pixels are compared.

With attention to still yet another aspect of the present invention, a saturated background color removal option is available, wherein when a saturated background color of an original document is altered to white. This is typically used to copy an image originally printed on colored paper.

A principal advantage of the present invention is the elimination of undesirable noise, i.e. dots in a background of a reproduced document.

Another advantage of the present invention is that the elimination of undesirable background color provides a linear manipulation of pixels in an intermediate area.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

FIG. 15 provides a graphical illustration of the stretch transform;

FIG. 16 depicts how the luminance stretch slope (lss) is varied as a function of color space distance;

FIG. 17 is a top-level block diagram of the RTE module; and

DETAILED DESCRIPTION OF THE PREFERRED EMBODIMENT

Figure 1:
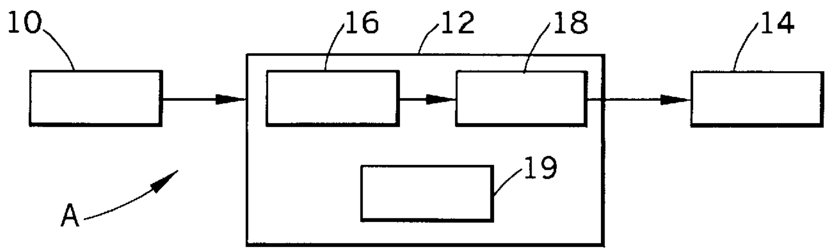
FIG. 1 is a block diagram of an image path of a color digital copier.
Figure 4:
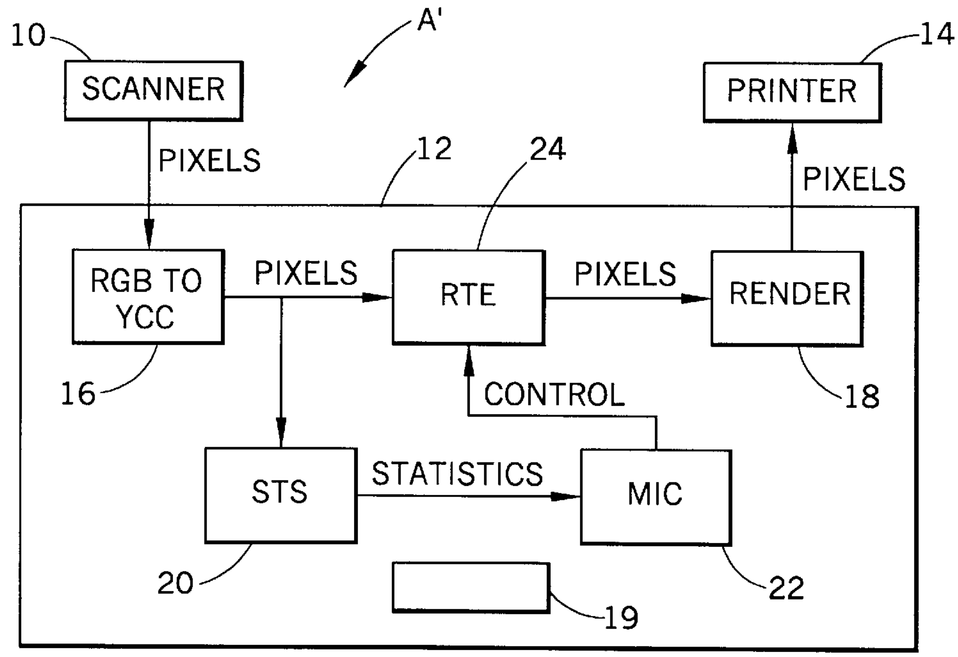
FIG. 4 is the image path of a color digital copier including the components of the present invention.

Referring now to the drawings, wherein the showings are for illustrating a preferred embodiment of the invention only and not for purposes of limiting same. While FIG. 1 is a block diagram of an image path for an existing color digital copier, FIG. 4 provides such a block diagram including components directed to the present invention. Within imaging electronics 12 of digital color copier A, the present invention further includes STS module 20 which accumulates document statistics, MIC module 22 which extracts document background characteristics, and RTE module 24 used to manipulate a pixel stream generated by scanner 10 to remove background noise. STS module 20, MIC module 22 and RTE module 24 work together to perform a pixel transformation that maps selected pixels to pure-white in order to remove background noise. As previously noted, color space converter 16 converts pixels from scanner 10 which are in an RGB color space to another color space such as YCC or LAB pixels. Pixels in these color spaces are defined by components (also known as channels) C0, C1, and C2. Wherein the C0 component represents the luminance of the pixel, and C1 and C2 represent the hue. As similarly shown in FIG. 1, microcontroller 19 is used to control operation of the digital color copier A.

Figure 5A:
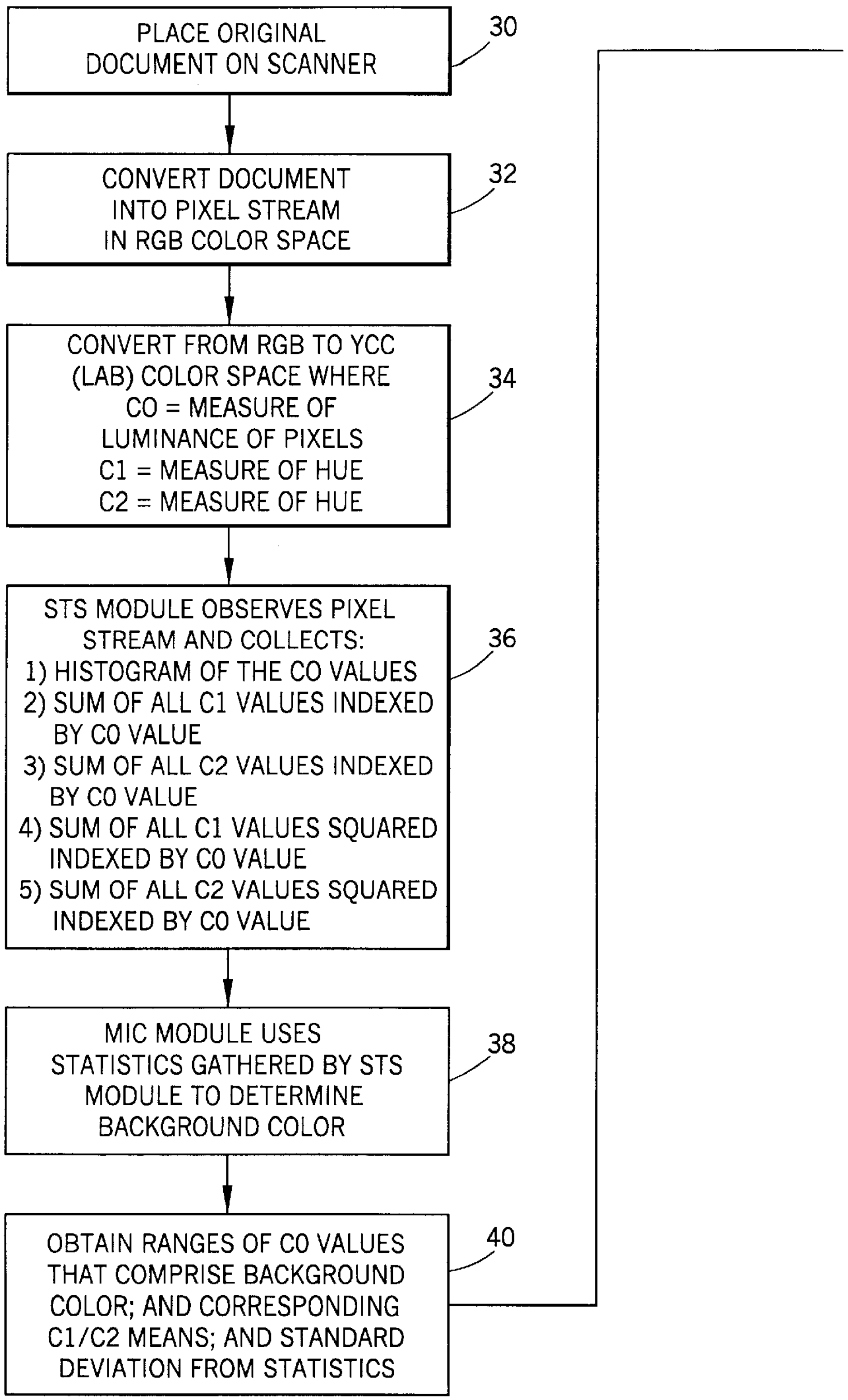
FIG. 5 is a flow chart providing an overview of the operation of the present invention.
Figure 5B:
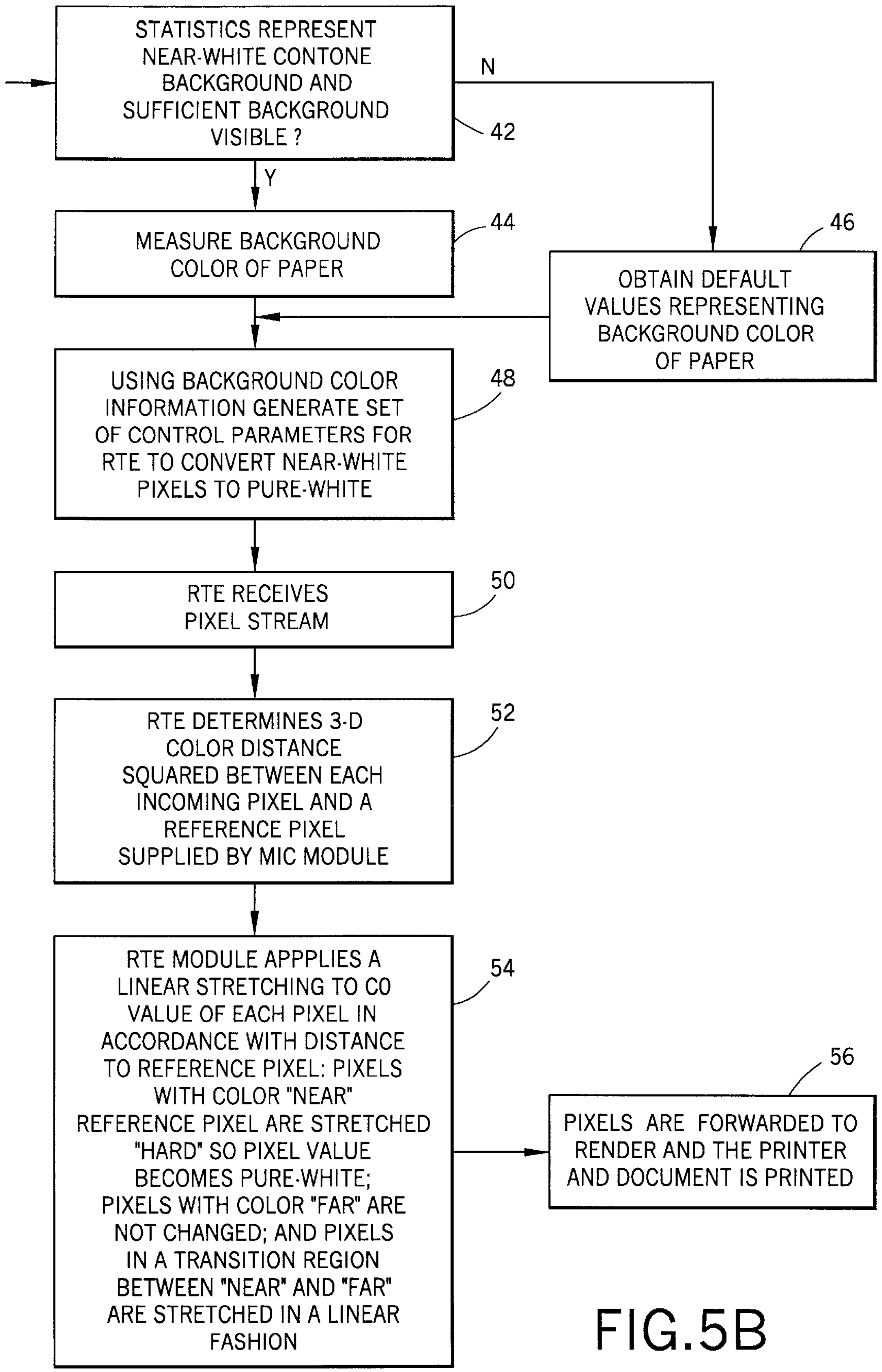

An overview of the operation of the present invention is described with attention to FIG. 5.

Initially, a user places an original document to be copied on a scanner, 30, and the scanner converts the document into a pixel stream in the RGB color space, 32. A color space conversion is undertaken to convert the pixel values from the RGB color space to a color space more closely mimicking the human eye such as a YCC or LAB color space, 34. The STS module observes the pixel stream from the scanner and collects statistical data 36. This data is used to develop statistics including:

a histogram of the C0 values;

a sum of all C1 values indexed by the C0 value;

a sum of all C2 values indexed by the C0 value;

a sum of all C1 values squared indexed by the C0 value;

a sum of all C2 values squared indexed by the C0 value.

In step 38, the MIC module uses the statistics gathered by the STS module to determine the background color. The background color is in part determined by looking for the brightest region of the histogram that is the same color. In the present embodiment, the background is identified as one of the four following choices:

near-white contone (e.g. white copy paper, newspaper)

near-white, halftone (e.g. magazine paper)

far-white, contone (e.g. photo or colored paper) and far-white, halftone (e.g. magazine paper).

Next, in step 40, the range or dispersion of C0 values that comprise the background color and the corresponding C1/C2 means and standard deviations are obtained from the statistics. If the statistics appear to represent a near-white, contone background and enough of the background is visible, 42, the MIC module uses the statistics to measure the background of the paper and generate reference pixel values 44. Otherwise, default background reference pixel values are used, that are determined to work well for high quality paper (the most common type of document being copied), 46. The MIC module uses the background information to create a set of control parameters to program the RTE module for conversion of near-white background pixels to pure-white in order to eliminate background noise 48.

The RTE module receives the pixel stream originally generated by the scanner 50, and determines the three dimensional color distance squared between the values of each incoming pixel and the background reference pixel values (supplied by the MIC module based on the determined background values or the default values) 52. The RTE module applies a stretch algorithm to the C0 component of incoming pixels of the pixel stream 54. This stretching of the C0 component is accomplished in accordance with the determined distance of each incoming pixel from the background reference pixel. When a received pixel has a color value "near" to the reference pixel value it is stretched sufficiently so that the C0 component becomes pure-white (i.e. a value of 255). Pixels with a color value "far" from the reference pixel are not changed, and pixels in a transition region between "near" and "far" are stretched in a linear fashion. Thereafter, an improved copy is printed having background noise removed 56.

Figure 2:
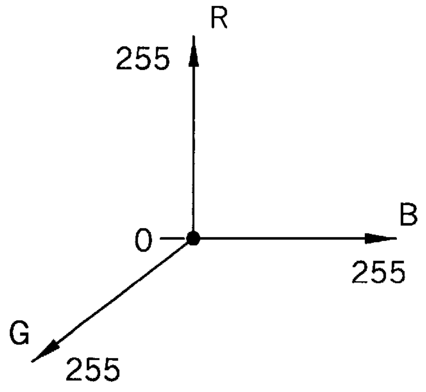
FIG. 2 is a graphical representation of the three dimensional RGB color space.
Figure 3:
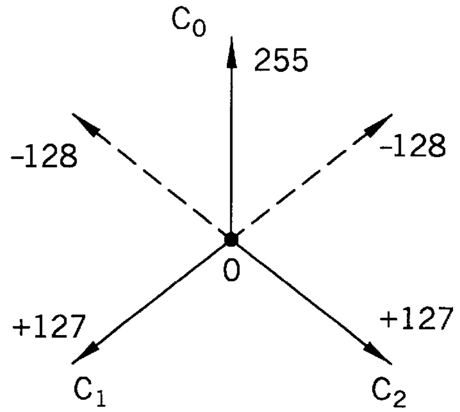
FIG. 3 is a three dimensional graphical representation of a 4-bit color space such as a YCC or LAB color space.
Figure 6:
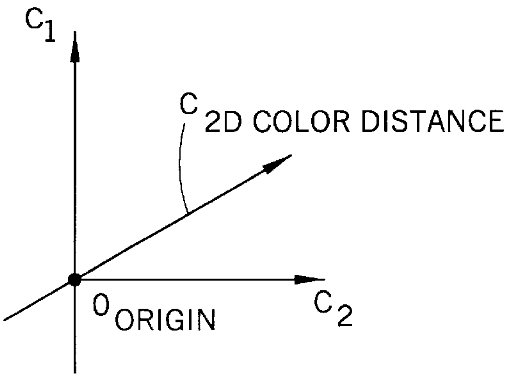
FIG. 6 illustrates a relationship between C1 and C2 values of a pixel whereby the concept of two dimensional color distance is defined.

Turning attention to a more detailed review of the present invention, it will be useful to discuss the concept of two dimensional color distance. FIGS. 2 and 3 which depict the RGB and YCC color spaces, illustrate that these color spaces are represented in three-dimensions. A relationship between C1 and C2 is shown in FIG. 6, where $C_{2d\ color\ distance}$ represents a two dimensional color distance and is found by the equation:

$$C_{2d\ color distance} = \sqrt{C1^2 + C2^2}$$

Figure 7:
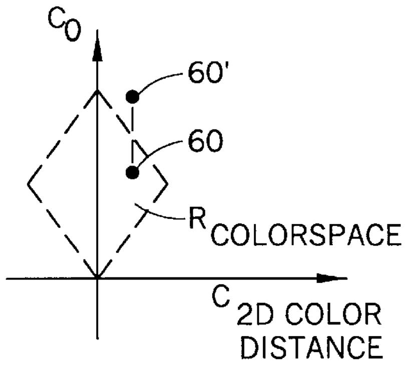
FIG. 7 is a graphical correlation between the two dimensional color distance and luminance upon which is defined a color space.

The two dimensional color distance, $C_{2d\ color\ distance}$, represents the amount of color existing in a pixel (i.e. how saturated is the pixel), wherein the farther from origin, $O_{rigin}$, the more saturated the pixel. Once $C_{2d\ color\ distance}$ is obtained the horizontal plane of FIG. 6 may be collapsed and the value of $C_{2d\ color\ distance}$ correlated to illuminance, C0, as shown in FIG. 7. The farther C0 is from $O_{origin}$, the greater the illuminance of the pixel. Similarly, the farther $C_{2d\ color\ distance}$ is from the $O_{origin}$, the more saturated the pixel.

In connection with the C0, $C_{2d\ color\ distance}$ relationship shown in FIG. 7, a desirably saturated color, which is not too bright as to be washed out or too gray, is located within a region, $R_{color\ space}$, which represents an entire color space such as the YCC color space. Since it is possible to increase luminance, C0, by multiplying the C0 value by some value, a pixel at location 60 within $R_{color\ space}$ can be stretched by multiplying C0 by a number such that the pixel is moved to location 60'. By this operation, a portion of the color space has been increased such that it becomes washed out, and to the human eye appears pure-white.

The stretching of pixels out so as to extend $R_{color\ space}$ so that pixels in the extended area appear pure-white to the human eye is applied in the present invention to achieve a reduction in undesirable color background noise.

Figure 8:
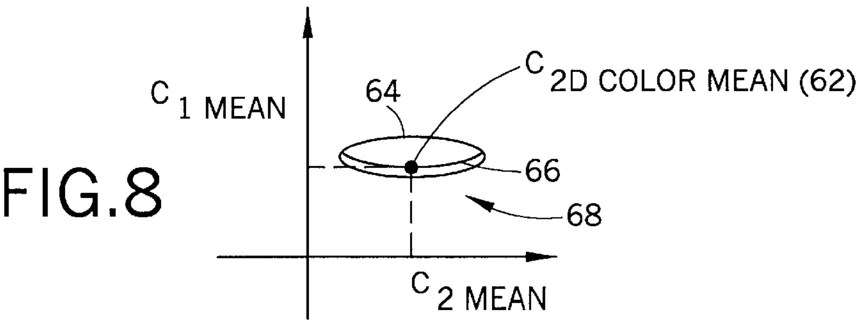
FIG. 8 defines a point of the C1 mean and C2 mean around which is formed a three dimensional ellipse.

As previously noted, the YCC, and other such color spaces, are represented in three dimensions. An aspect of the present invention is to determine a measure of the background color. The data to make this determination is obtained from STS module 10. Using information from STS module 10, the mean C0 value, the mean C1 value, and the mean C2 value are obtained. As shown in FIG. 8, the C1 mean value and the C2 mean value are combined to obtain a $C_{mean}$ 62, which is the mean hue value of the background. Thereafter, a standard deviation around $C_{mean}$, is determined (in this embodiment a +−3.0 standard deviation, around the $C_{mean}$), 62 and a two dimensional ellipse is generated 64.

Assuming the above ellipse is defined as being a slice of the color space (e.g., horizontal), it is also possible to take a further slice in another direction, (e.g. such as a vertical direction) by which a second two dimensional ellipse is formed 66. Combination of these slices define three dimensional ellipse 68.

Figure 9:
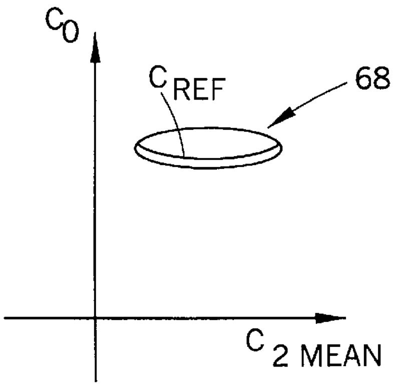
FIG. 9 correlates Cmean and C0 values to define a Cref value around which is formed a three dimensional ellipse.

Three dimensional ellipse 68 can then be graphed versus the C0 mean, as shown in FIG. 9. Thus, point Cref of three dimensional ellipse 68 is at the C0 mean, C1 mean and C2 mean. The above operations define at least a part of the three dimensional color space.

Figure 10:
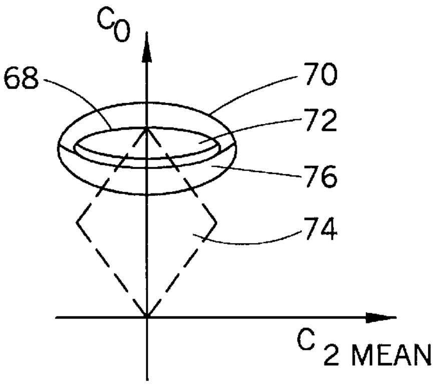
FIG. 10 illustrates outer and inner three dimensional ellipses formed around a Cref value.

As depicted in FIG. 10, in addition to three dimensional ellipse 68 (which will be referred to as the inner ellipse), an outer three dimensional ellipse 70 corresponding to inner ellipse 68, but of a larger size, is also generated.

With continuing attention to FIG. 10, Cref represents the pixel value for background color and intensity. The value of Cref is compared to values of pixels which have been scanned by scanner 10 and transformed into the YCC or LAB color space. Dependent upon the values of the pixel being compared to the Cref value, certain operations will take place. For example, for a pixel 72 which has values placing it within inner ellipse 68, the C0 value of pixel 72 is multiplied by a scale factor which causes pixel 72 to become pure-white (a value of 255), i.e. the C0 value is moved out of $R_{color\ space}$ Pixel 74, which is outside of outer ellipse 70, is multiplied by a unity factor, i.e. 1, such that no change is made to the pixel value C0. Pixel 76 which is outside of inner ellipse 68 but within outer ellipse 70 has its C0 value linearly increased, allowing for a smooth transition between a no change situation to forcing a pixel to pure-white.

Through the above operations, those pixels within inner ellipse 68 are forced to pure-white and those outside of outer ellipse 70 are not changed. Further, those pixels within outer ellipse 70, but outside inner ellipse 68, are provided with a smooth transition. It is noted that reference Cref is obtained from statistics collected by STS module 20. The use of the linear stretching is especially useful when part of a document being scanned includes a color bar which fades from a very saturated end to a highly unsaturated end.

In some cases, a clear indication of the background color will not be obtained. In these situations the present invention provides default values and these values are used for generation of the required information including that to generate three dimensional inner ellipse 68 and three dimensional outer ellipse 70.

The above-discussed comparison between incoming pixels and Cref includes obtaining a three dimensional color distance of the incoming pixel as to Cref. One manner of obtaining the three dimensional color distance is as follows (it is noted for use in the present embodiment scaling factors will also need to be included in this calculation):

$$3D \text{ color distance} = \sqrt{(C0 - C0\ ref)^2 + (C1 - C1\ ref)^2 + (C2 - C2\ ref)^2}$$

An alternative to obtaining the three dimensional distance using square root calculations, is to use a distance squared calculation. The above square root calculations would, in the present invention, require scaling factors for appropriate application. This is beneficial in the present invention as square roots are expensive in hardware terms. Whatever operation is used, it is important to note that the object is to use some metric that provides information as to a distance an input pixel value is from a reference pixel value. It is important to find this value, since then a proper scaling factor, i.e. stretching value, may be applied to incoming pixels.

The information used to determine the background color, is obtained during an initial scan of the original document. It is common in color scanners, that while all lines of a document are scanned, the first fifty or so lines are normally not printed on, this portion therefore is a useful source to gather data concerning the background color. This information is collected by STS module 20 and used as the reference color value in three dimensions.

Further, existing copiers perform their document generation in real time. Therefore, it is necessary for the operation of the present invention to occur in real time. Particularly, two passes cannot be made, where on a first pass the STS module collects statistics of an entire page, and then on a second pass the actual copying operation takes place. Rather, it is necessary that STS module 20 be able to collect its information in a single pass. It is to be appreciated that STS module could be programmed to use more or less than the fifty described lines, and that the present invention could be used with a multipass copier.

With more particular attention to the elements of the present invention, STS module 20 collects a histogram for a document which is to be copied, into an internal RAM. A microcontroller such as microcontroller 19 of the copier reads the histogram from the RAM and computes RTE parameters to enhance the document. It is to be appreciated that while FIG. 4 shows microcontroller 19 as part of the image processing electronics 12, the present invention can function in various configurations, including those where control of the copier is centralized or distributed within individual components.

Figure 11:
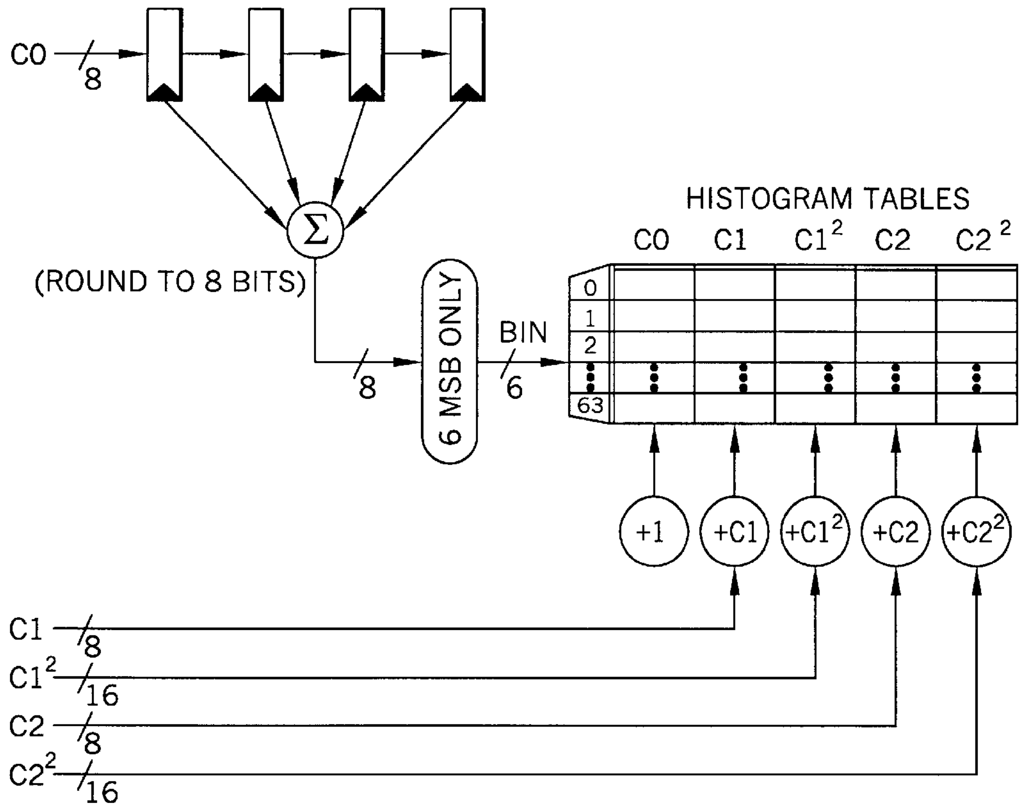
FIG. 11 illustrates the histogram of the present invention.

The histogram, as shown in FIG. 11, is an array of 64 bins (0–63) each containing five tables (C0, C1, $C1^2$, C2, $C2^2$) STS module 20 takes the last four C0 values and averages them, and the most significant 6 bits of the average are used to select one of the 64 bins. The averaging is used to help deal with halftones, without it, the average value of halftones could not be determined. The average is computed as (suffix_dn represents a delayed version of the value by n cycles):

C0 avg=(((C0+C0_d1)>>1)+((C0_d2+C0_d3)>>1)>>1)

This approach introduces a maximum error of −1 as compared to the more accurate approach of adding all four values and then right shifting by two. For example, assume the four values 0, 1, 0 and 3 are averages. The first approach produces an average of 0 whereas the latter approach produces an average of 1. While either approach may be used, it is noted the latter requires 10-bit sums to be stored whereas the first only requires 8-bit sums.

The average calculation produces the wrong result for the first three pixels on a line. This error is negligible for lines of any reasonable width. For the first line on the page, the C0_d1, C1_d2, and C0_d3 values will be 0. For other lines, the C0_d1, C0_d2, and C0_d3 values will be carried over from the previous line.

As a 6-bit value is being used in a 64 bin arrangement, any C value in the range of 0–3 is allotted to the first bino, any C value from 4–7 is allotted to bini, any C value from 8–11 is allotted to bin2, . . . , and any C value from 252–255 is allotted to bin63. Each bin has five pieces of information gathered, i.e. tables C0, C1, $C1^2$, C2, $C2^2$. When a pixel value is entered, and a bin is picked, information is input into the C0 value table and then is incremented, i.e. +1, to the C1 table and so on. The selected bin in the histogram is updated as follows:

```
HIST [bin]. C0+=1
HIST [bin]. C1+=C1
HIST [bin]. C1_sq+=C1 × C1
HIST [bin]. C2+=C2
HIST [bin]. C2_sq+=C2 × C2
```

Following the initial scanning, wherein values are input into the bins based on the first 50 scanned lines, the contents of the tables are then reviewed to obtain a count of values in each of the bins. Each entry in a table indicates how many pixels having a certain value were encountered during the scan. In particular, reading binO, for the C0 table will indicate the amount of pixels having a C0 value in the range of 0–3.

If the copier is being operated in a black and white mode, or if the present invention were used in a black and white copier, the information regarding C0 is the only table that would be necessary, i.e. luminance. However, in a color copier data regarding tables C1, $C1^2$, C2 and $C2^2$ will also be used.

The C0 table is used to determine the distribution of luminance values. The C1 and C2 tables are used to determine the distribution of the color means associated with the luminance values. The $C1^2$ and $C2^2$ values are used to determine the distribution of color standard deviations associated with the luminance values. The microcontroller computes the mean and standard deviation of the hue components (C1 and C2) for a range of bins. Since the STS module uses the biased values of C1 and C2, the effect of the bias-must be accounted for.

Therefore, letting the biased value be C, the unbiased value be X, the bias B, and the number of samples N. By definition, X=C−B. Then the unbiased mean is:

mean=SUM(X)/N

It is computed by the microcontroller as:

$$\begin{aligned} \text{mean} &= SUM(X)/N \\ &= SUM(C-B)/N \end{aligned}$$

-continued $$= SUM(C)/N = N*B/N$$
$$= SUM(C)/N - B, \text{ and}$$

The unbiased standard deviation is:

$$sdev^2 = SUM(X^2)/N - mean^2$$

It can be shown that biased and unbiased standard deviations are identical (since the bias is just a linear shift of the distribution). Therefore, the unbiased standard deviation is:

$$sdev^2 = SUM(C^2)/N - mean^2$$

The microcontroller, for example microcontroller 19, of FIG. 4, reads the contents of the STS histogram tables, and provides this information to MIC module 22 in order to make a determination regarding the background color. The above information is then provided to RTE module 24, and includes background color values, the size of the ellipses, and where the ellipses are located within the color space.

These operations occur at a rate early enough such that this information processing will be completed before pixels are actually printed out. It is to be appreciated that while ellipse type configurations are used in this explanation, other shapes may also be used.

The microcontroller collects statistics from the STS module according to the following sequence:

clears out the contents of the histogram;

programs STSLC (STS line count) location to the desired number of lines (e.g. first 50) to be examined for collecting statistics;

enables the STS module to collect statistics;

starts the flow of pixels;

the STS asserts an interrupt to the microcontroller when the programmed number of lines has been processed;

clears interrupt conditions in the STS;

the microcontroller reads the histogram from the STS module (typically it stops the flow of pixels but this is not a requirement);

the microcontroller provides the information from the histogram to the MIC module to compute parameters for the RTE module to enhance the remainder of the document;

the microcontroller loads the parameters into the RTE module; and the microcontroller restarts the flow of pixels (assuming that it stopped the flow earlier).

Figure 12:
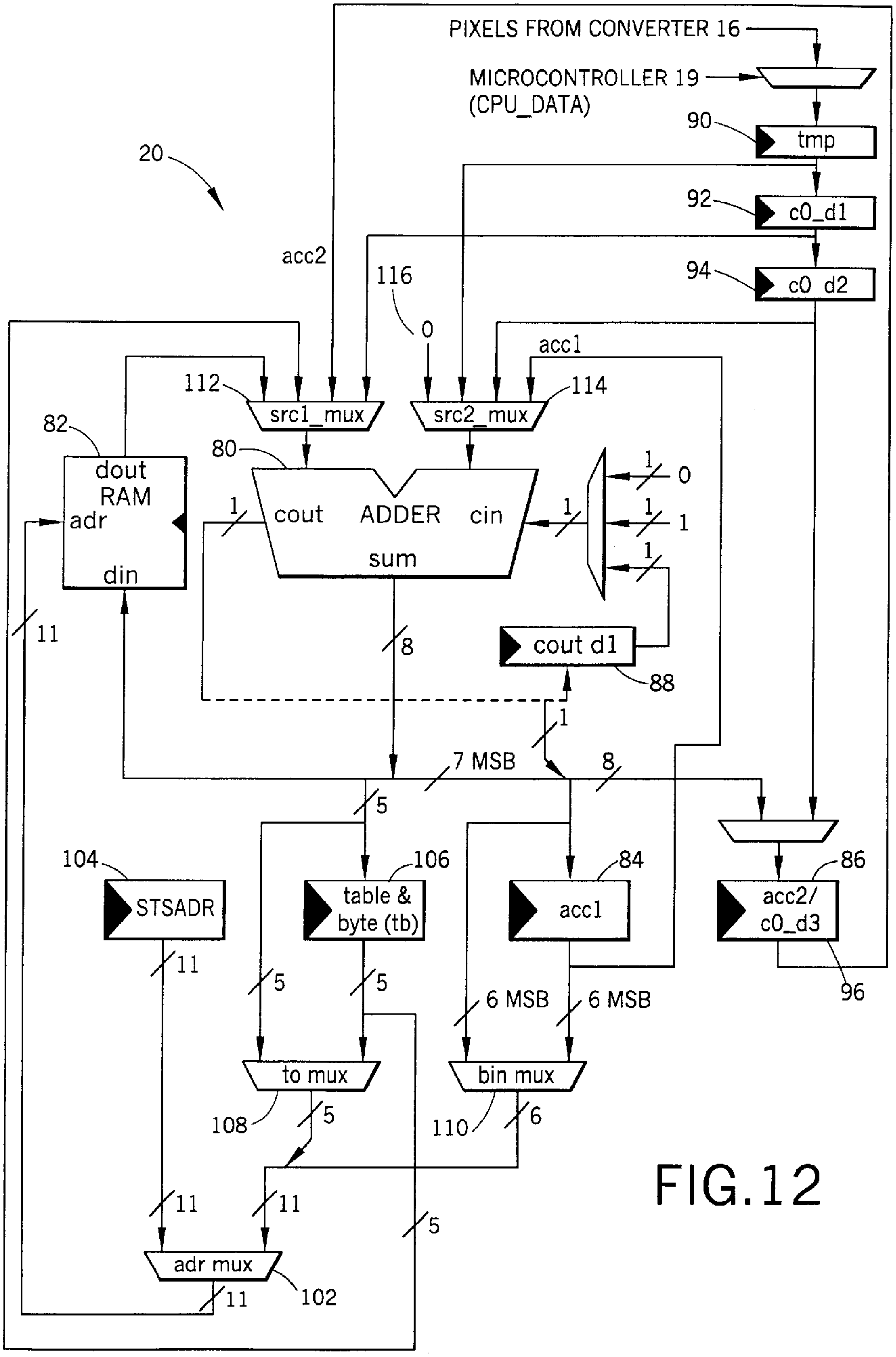
FIG. 12 defines the STS data path of the STS module.

Turning to a more specific description of STS module 20, the STS datapath, shown in FIG. 12, contains an adder, registers to hold temporary values, and a RAM. The RAM holds the histogram. All wires not marked are 8 bits wide. Also, unless otherwise specified, when a wire is reduced in bit width, it discards the most-significant bits.

The heart of the datapath is a fast 8-bit adder 80. The output of the adder 80 is fed to several registers and the din (data in) input of the RAM 82. The registers acc1, 84, and acc2, 86, operate as accumulators and hold results of temporary calculations. The carry output (cout) of the adder 80 is stored in register cout_d1, 88, and then presented to the adder's carry in (cin) input. This allows the adder 80 to perform additions greater than 8 bits.

When STS module 20 is collecting the histogram, it receives pixels (one component at a time) from color space converter 14. It stores component values (C0, C1, C1² low, C1² high, C2, C2²low or C2²high) in the tmp register 90. STS module 20 maintains a 4-pixel C0 context in the tmp 90, c0_d1 92, c0_d2 94, and cO_d3 96, registers. It adds these four values together using the adder 80 and the two accumulator registers, acc1 84 and acc2 86. The result of each addition is divided by 2 using a wired right shift. After the three additions, the average of the 4 values is stored in the acc1 register 84.

The adr_mux 102 selects the source of the RAM address as either the STSADR 104 register or the tb register 106 and bin register which is part of the RAM. The STSADR 104 register is selected when the microcontroller, such as microcontroller 19, requests access to the RAM 82. The STSADR register 104 which includes STSADRLO and STSADHI components (not shown), contains the address within the STS histogram that the microcontroller wants to access. The tb (table and byte) register 106 and bin registers are selected when the STS module 20 is processing pixels. The tb register 106 is incremented by the adder 80 so that each byte of a histogram bin can be accessed. The bin is specified by the most-significant 6 bits of the C0 average stored in acc1 84.

The tb_mux 108 and bin_mux 110 are used to select between the stored values of tb and bin and newly computed values of tb or bin. The adr mux 102 is used to select between the STSADRHI, STSADRLO, and tb registers. The selected value is incremented by the adder 80 and stored.

The adder's input operands are selected by the src1 mux 112 and src2 mux 114. The src1 mux 112 selects the RAM data output, part of the RAM address to increment, c0_d1 92, or acc2/c0_d3 86, 96. The src2 mux 114 selects the constant zero 116, tmp 90, co_d2 94, or acc1 98.

Programmable registers are written via the cpu_data bus, i.e. for communication with microcontroller 19, by storing the cpu_data into the tmp registers and then passing the data through the adder (by forcing acc2=0). The STSADR 104 register is incremented by adding 1 to STSADRLO and then propagating the carry to STSADRHI. The RAM is read via a RDPRE register (not shown), which is loaded with the RAM data whenever the STSADR register is written by the microcontroller.

Turning attention to MIC module 22, as previously discussed, the information from the histogram of STS module 20 is used by MIC module 22 to generate parameters, including, the background reference color values and luminance values, to be used by RTE module 24.

Figure 13:
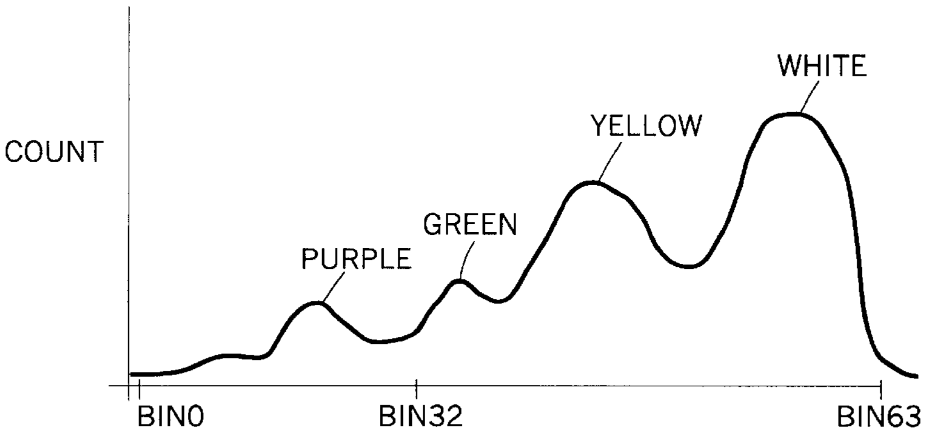
FIG. 13 is an example of a plot the contents of the histogram as counts versus bins.

FIG. 13 plots the contents of the histogram as counts versus bins. The count value indicates the number of pixels collected within a particular bin during scanning of the predetermined number of lines, e.g. the first 50 lines. As it may be recalled, each bin of the histogram corresponds to three values, e.g. binO counts pixels having C0 values 0–3, whereas bin63 counts pixels having C0 values 252–255. The first 50 scanned lines will tend to represent the background color. Therefore, there should be more background color than any other color, i.e. the C0 bins with the highest count of pixels will likely represent the background color. In FIG. 13 the bins with the highest counts are shown with the highest peaks.

If operating in black and white mode, all that is required is to select a peak with the highest C0 value as a background color. However, in a color copier it is necessary to know more than just how light or dark an image is.

Nevertheless, MIC module 22 can use the C0 values to arrow the range of bins which appear to be the most appropriate selections as representative of the background. Particularly, those counts in the higher bins are more likely to represent a white background color. In the color mode, the bins are used as an index of an array for information to be provided by MIC module 22 to RTE module 24. Particularly, as recalled from FIG. 11, associated with each C0 value are C1, $C1^2$, C2, $C2^2$ values. These values are used to obtain reference values which are provided to RTE module 24, i.e. the calculation of the mean values and the standard deviation.

The invention can be configured to select a single bin as representing a peak value component or a plurality of bins within a range. If a range of background colors are selected then there is a summing of C1, C2, $C1^2$, $C2^2$ (e.g. if bins 53–58 are considered representative of the background color). The reference background value is then calculated and forwarded to RTE module 24.

Turning attention to a more specific discussion of RTE module 24, this module applies image enhancements to pixels using a one pixel context. It accepts pixels from scanner 10 and sends enhanced pixels to render 18.

Enhancements are grouped into two categories: luminance enhancements and hue enhancements. Luminance enhancements consist of a color-sensitive contrast enhancement, user control brightness, and colored-background removal. Additionally, in gray scale mode, an arbitrary curve is applied to the luminance component, i.e. C0, to account for non-linear TRC (Tonal Reproduction Curve) of the printer. Hue enhancements consist of user controlled color saturation (pale/vivid). All these enhancements are a function of the image statistics (collected by STS module 20) and user interface controls.

RTE module 24 has several parameters that control its image enhancement algorithms and a 256-bit luminance look-up table. All these values are stored in a RAM inside RTE module 24. It is the responsibility of the microcontroller to load the contents of the RAM appropriately. The luminance look-up table and some selected enhancement parameters can be loaded before processing of the document begins. The remaining parameters are loaded after appropriate statistics have been collected on the document.

RTE module 24 nominally applies its luminance enhancements to C0 and its hue enhancements to C1 and C2. When the pixels entering RTE module 24 are in the YCC or LAB color space the intended enhancements are implemented. However, when pixels in other color spaces (e.g. RGB) enter RTE module 24, the enhancements are programmed to just pass C0, C1 and C2 of the pixels through RTE module 24 unaltered.

RTE module 24 uses global color space signals to determine whether to operate in color or in black and white mode and to determine the hue coding biases.

On reset (hardware or software), RTE module 24 forces state machines to the idle state as long as a reset persists. An exception is made to this for RAM access. In this situation only a hard reset forces the RAM access state machine to idle. Therefore, the RTE RAM can be accessed independently of the state of soft reset.

Figure 14:
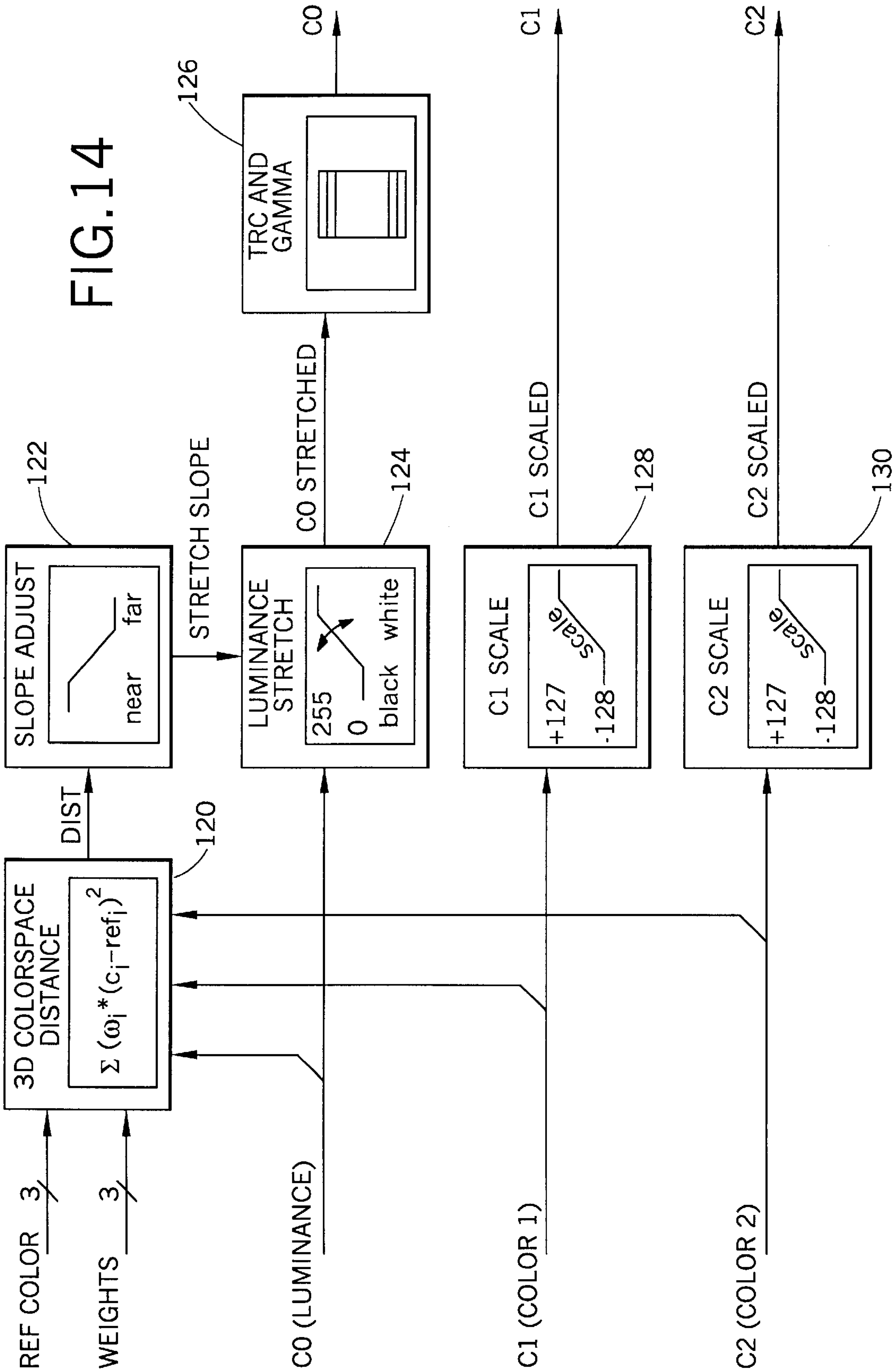
FIG. 14 is a data flow diagram for the RTE module.

With attention to FIG. 14, depicted is a data flow diagram for the RTE module enhancements. The following discussion corresponds to the previously set forth ellipse concepts.

A weighted three dimensional distance between the input pixel (represented by C0, C1 and C2) and a reference pixel is computed by 3D color space distance computation block 120. This distance is used to compute a luminance stretch slope by slope adjuster block 122. The input C0 value is multiplied by the slope and limited to the range of 0 to 255 in the luminance stretch block 124. This stretch C0 value is passed through a 256 bit look-up table 126 to produce the output C0 value. The table contains a printer TRC (black and white mode only) and a gamma brightness curve (all modes). The C1 and C2 input values are multiplied by a scale factor and limited to the range −128 to +127 to produce the C1 and C2 output values by C1 scaling block 128 and C2 scaling block 130.

Color-sensitive contrast enhancement and colored background removal are implemented by applying a stretch transform to the luminance (C0) value. FIG. 15 provides a more detailed look at the stretch transform. Particularly, any input C0 value less than or equal to the black point (black_pt) is transformed to 0 (pure black). Any input C0 value greater than or equal to the white point (white_pt) is transformed to 255 (pure white). Intermediate values are stretched by the slope of the line between the black and white points. This slope is known as the luminance stretch slope (lss), and is greater than or equal to 1. The white and black points are computed by the microcontroller as a function of the image statistics (from the STS module) and user interface controls, i.e. color and luminance selection controls.

The contrast of a document is not reduced by the stretch transform. This effect is obtained by the user adjusting the lightness/darkness control instead.

The equation used to implement the stretch transform shown in FIG. 15 is:

c0_stretched=(c0_in—RTE—BLACK—PT)*lss (where: c0_stretched is limited to range [0, 255])

In black and white mode, the lss is a constant for the document and is provided by the microcontroller. In color mode, the lss is computed for each pixel.

A color-sensitive contrast enhancement varies the white point as a function of the distance between two points in the color space; the pixel being processed and a reference pixel. The distance only is in three dimensions. Pixels closer to the reference are stretched harder (i.e. smaller white point and larger slope) than pixels further from the reference. The reference is computed by the microcontroller as a function of the image statistics and the user interface controls. The intention is that the reference is the background color of the paper and is unsaturated. Therefore, unsaturated pixels are stretched harder than pixels that are more saturated. This helps prevent bright saturated colors from being washed out by the stretch but still allows unsaturated pixels to have a large contrast and remove background noise. This scheme is especially effective when processing documents that were printed on low-quality paper (such as newspaper) since the paper is not as uniformly white as higher-quality paper.

The colored-background removal enhancement uses the color-sensitive contrast enhancement and the color space distance is computed in three dimensions (C0, C1 and C2). Also, the reference pixel is set by the microcontroller to the background color of the paper even if the color is saturated. Now, only pixels with their color close to the background color and luminance close to the background luminance will be stretched the hardest (ideally to a C0 of 255 since this is pure white) and other pixels will be stretched lightest (ideally by unity).

The color space distance may be computed as:

dist=

((c0_in-RTE_DIST_REF_C0)*RTE_DIST_SCALE_C0/4)^2+

((c1_in-RTE_DIST_REF_C1)*RTE_DIST_SCALE_C1/4)^2+

((c2_in-RTE_DIST_REF_C2)*RTE_DIST_SCALE_C2/4)^2

As previously noted, a true three dimensional distance would require taking the square root of dist. In the present embodiment, the square root calculations are not used in order to simplify the hardware with little loss in image quality.

The scale factors allow the three channels (C0, C1 and C2) to have different contributions towards the color space distance. These scale factors are based on the distribution of the background color in each of the three dimensions of the color space. The microcontroller uses the image statistics (including C1/C2 means and standard deviations) to determine the distributions and compute the scale factors appropriately. The color-background removal enhancement is disabled by setting its scale factor to zero.

For both the color-sensitive contrast enhancement and the colored-background removal enhancement, the stretch is a function of color space distance. This is accomplished by making the luminance stretch slope a function of color space distance since it controls the white point via the equation:

white_pt=(255/lss)+black_pt

FIG. 16 shows-how the luminance stretch slope (lss) is varied as a function of color space distance. Pixels close to a reference point have the largest stretch slope (lowest white point) and pixels far from the reference point have the smallest stretch slope (highest white point).

The luminance stretch slope (lss) is computed according to the following equation:

lss=RTE_LSS_SCALE*dist+RTE_LSS_INTER (lss limited to range [RTE_LS_MIN, RTE_LSS_MAX])

The color-sensitive contrast and colored-background removal enhancements may be disabled by setting RTE_LSS_SCALE to zero and the RTE_LSS_INTER to the desired stretch_slope. If this is done, all pixels will be stretched using the same implied white point.

The user-controlled brightness and non-linear printer TRC compensation are implemented by applying a lookup table to the C0 component (after being stretched). This 256-byte lookup table allows an arbitrary transformation to be applied to the C0 component. This is required since the TRC is a non-linear function and the lightness/darkness is an exponential curve. This is implemented by the equation:

c0_out=RTE_TAB_C0[C0_stretched]

The user-controlled color saturation (pale/vivid) is implemented by scaling the C1 and C2 channels by a constant scale factor found by:

c1_out=c1_in*RTE_OUT_SCALE_C1 c2_out=c2_in*RTE_OUT_SCALE_C2

C1 and C2 are converted to an unbiased form (two's complement signed) before being multiplied by the scale factors and then converted back to their biased form. The bias is implied by the color space. The hue enhancements are not performed in black and white mode.

FIG. 17 shows a top-level block diagram of RTE module 24, wherein C0 is stretched by an appropriate value obtained through use of a C0 table lookup, and C1/C2 are scaled prior to being output.

Figure 18A:
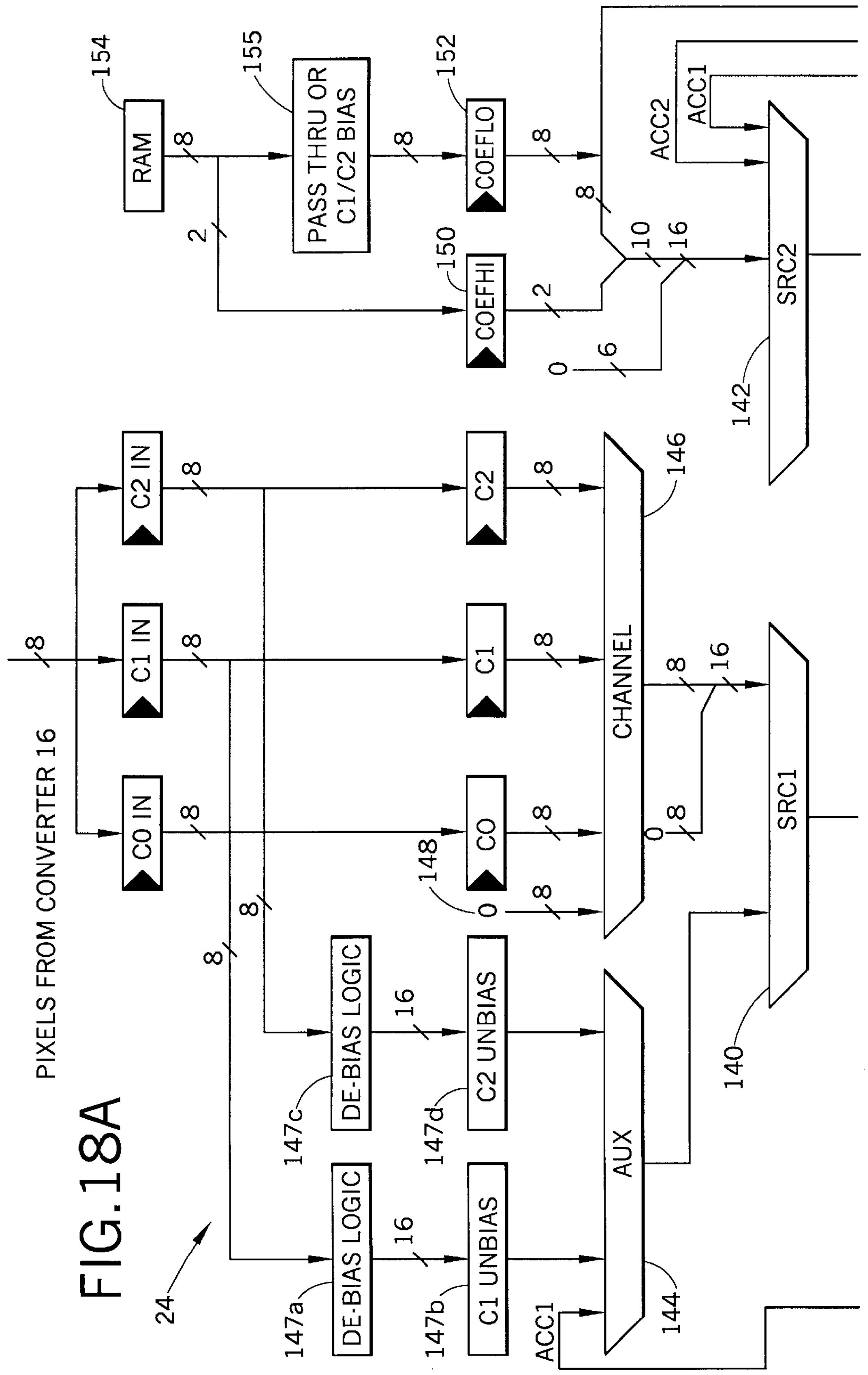
FIG. 18 is the RTE data path of the RTE module.
Figure 18B:
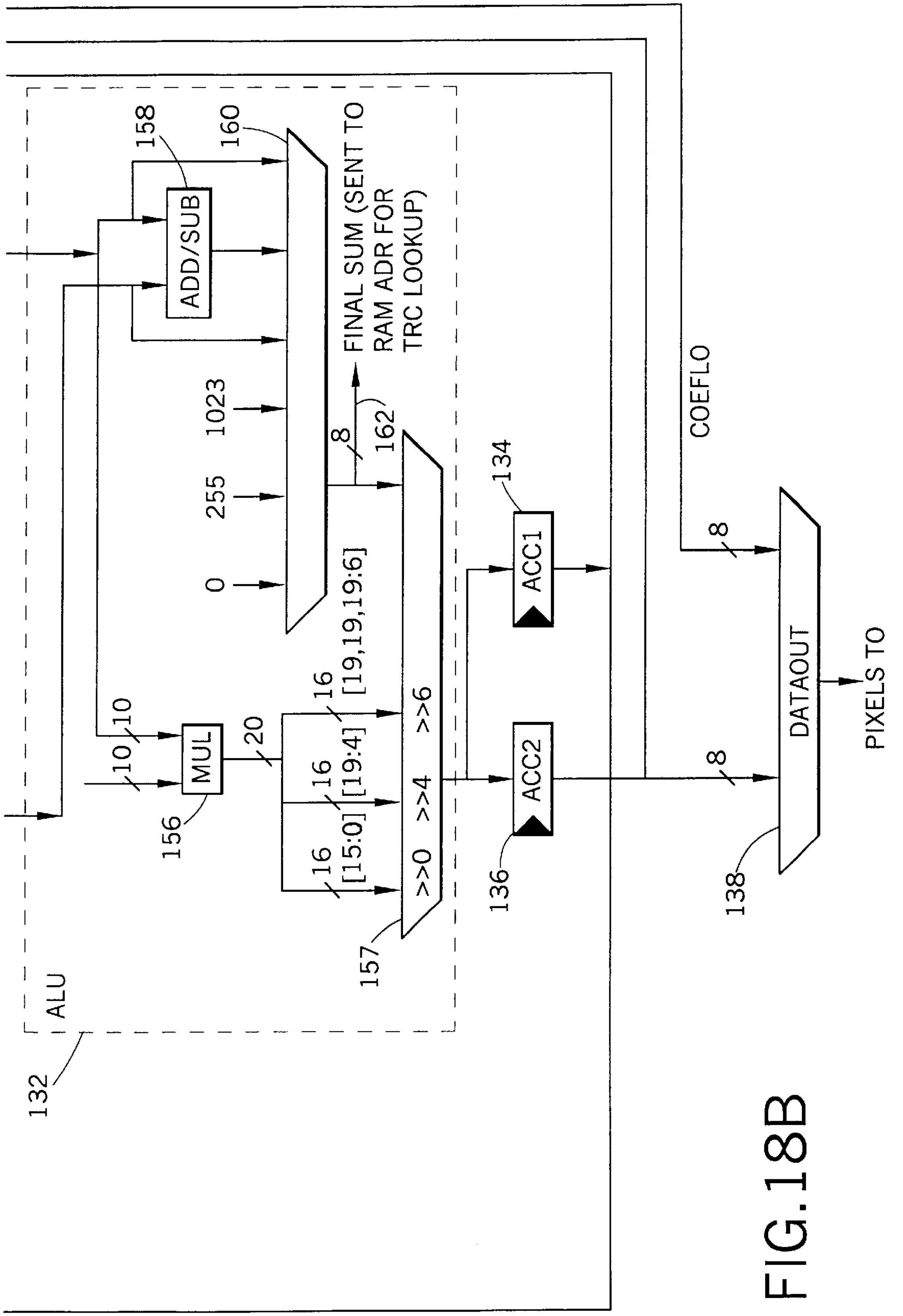

RTE module 24 uses a computational block to implement the luminance and hue enhancements except for the C0 table lookup. FIG. 18, which is the RTE data path of RTE module 24, shows the computational block consists of an ALU, muxes, and scratch registers. The enhancement algorithm parameters are stored in the RAM. All wires not marked are 16-bits wide. Also, unless otherwise specified, when a wire is reduced in bit width, it discards the most-significant bits.

ALU 132 performs a multiply or an add for each cycle. The result of the ALU 132 is stored in either one or two accumulators (ACC1 and ACC2) 134, 136 or in the DATA OUT register 138. The ALU 132 obtains its operands through the srcl mux 140 and src2 mux 142.

The srcl mux 140 in conjunction with the aux mux 144 and channel mux 146 select biased versions of C0/C1/C2, unbiased versions of C1/C2 from unbias blocks 147*a–d*, the constant zero 148, or ACC1 134. The zero input 148 is used in conjunction with the adder to pass values from the src2 ALU input to the ALU output.

The src2 mux 142 selects COEFHI/COEFLO 150, 152 (containing an algorithm coefficient), ACC1 134, or ACC2 136. The coefficients are zero-extended to 16 bits. The coefficient is composed of the 8-bit COEFLO register 150 and 2-bit COEFHI register 152. If an 8-bit register parameter is read from the RAM 154, the COEFHI 150 register is cleared. Otherwise, the COEFLO 152 register contains the least-significant 8 bits of a parameter and COEFHI 150 contains the most-significant 2 bits. The COEFHI receiving its bits from passthru or C1/C2 bias block 155.

The multiplier 156 performs a signed 11-bit by 11-bit multiplication producing a signed 22-bit product. The conversion of the product to a 16-bit value depends on whether the multiplier is in integer or fractional mode. In integer mode, the multiplier output is the least-significant 16 bits of the product. In fractional mode, the multiplier output is either the most-significant 14 bits (bits 6 to 19) sign-extended to 16 bits or the 16 bits from bits 4 to 19. The first choice produces an implicit right shift of 6 and the second choice produces an implicit right shift of 4. These right shifts of register 157 are used to discard lower-precision bits of a fractional result.

The adder 158 performs a 16-bit addition producing a 16-bit sum. The carry-in and carry-out signals are unused. Control logic examines the most-significant 8 bits of the sum and controls the mux 160 on the output of the adder to select 0, 255, 1023, or the sum. This is used to perform saturating additions (when required). Negative values are limited to 0 and positive values are limited to 255 or 1023.

The src1 or src2 operand can be bypassed to the ALU output by replacing the adder output with srcl or src2. This is only used for a min/max operation that subtracts srcl from src2 and then based on bit 15 of the difference (the sign bit), it selects srcl or src2.

In color mode, pixels are received from color space converter 16 in C0/C1/C2 order and sent to render 18 in the same order. The C0 component comes from the COEFLO register 152 and the C1/C2 components come from the ACC2 register 136. In black and white mode, only one component is active so there is no component order issue.

RTE module 24 contains one lookup table loaded into 256 bytes of the RAM 154. The stretched C0 value from the FINAL_SUM 162 output of the adder/subtractor is used to address this 256 bytes of the RAM. The RAM 154 can also be read, or written indirectly through read/write operations, using a RAM_ADR input.

The operation described in the foregoing to remove background noise can include various safety features. Including that if the background color is determined to have a certain saturation value, the system will select a default operation and will not stretch pixels to the background color. This feature is available as it is not as necessary to place additional toner on a dark background as it is to remove undesirable spots from a white background.

Another alternative feature is that when a dark background color is encountered, it is possible to have an option to alter the background color to a white color. This is a valuable feature in situations where an original document has a dark background color and copies are to be made. By causing the background to be changed to white, less toner will be used.

As previously noted, the present embodiment will seek a maximum peak as being representative of the background color. Of course in some situations there may be several peaks of equal size. Therefore, to increase accuracy, the system may be configured to select the brightest/largest peaks. Similar to the foregoing, the system can be configured with minimum and maximum peak values which is not encountered results in default operations.

Once the background color is predicted, the present invention generates a confidence factor, wherein a high degree of confidence indicates that it is the actual background color represented by (1) or a low degree of confidence (0). When the confidence factor is high, the areas of change, represented by the ellipses, are sized to increase the background area to be reviewed. As the confidence factor declines, the size or dispersion of the ellipses are made smaller. The low confidence factor may be based on encountering numerous peaks of the same ize or that the detailed background color is a saturated color. When the confidence factor is below a certain predetermined value, a default option is implemented where minimal sized areas, i.e. ellipses are generated.

These default ellipses are sized conservatively and are generated from fixed values that tend to work well for a particular scanner. This default mode is beneficial for a situation where the fifty scanned lines are found to be very saturated, but as the document comes down the page, there are areas of near-white. In such a document if there was no default value, i.e. no ellipses at all, these near-white areas (which would contain undesirable marking) would not be improved. Thus, the default value ignores the material provided due to the statistics and uses the conservative default back-up.

While the foregoing modules have been discussed as individual components, it is appreciated that their functions can be combined or included with each other.

The invention has been described with reference to the preferred embodiment. Obviously, modifications and alterations will occur to others upon reading and understand the preceding detailed description. It is intended that the invention be construed as including all such modifications and alterations insofar as they come within the scope of the appended claims or the equivalents thereof.

Having thus described the preferred embodiment, the invention is now claimed to be:

1. A method of eliminating background noise in a document reproduced by a digital copier, the method comprising the steps of:

acquiring statistics for at least some pixels of a stream of pixels of a document scanned by a scanner, to determine the background of the document;

extracting document background characteristics using the acquired document statistics;

using at least one of the acquired document statistics or default values to determine the background to be one of near white contone, near white half-tone, far white contone and far white half-tone;

manipulating the pixels of the pixel stream based on the acquired document statistics or the default values, to remove background noise in the reproduced document thereby generating a substantially pure white background from at least one of the near white contone background, near white half-tone background, far white contone background and far white half-tone background.

2. In a digital copier having a scanner, image processing electronics and a printer, images on an original document are converted into a stream of pixels by the scanner, image processing electronics manipulate the pixel stream into a form suitable for the printer, and the printer transfers toner or ink to a copy paper thereby reproducing the images on the copy paper, the digital copier including a document enhancement device comprising:

a means for determining a background color value of the original document, the means including a histogram which stores C0 values, C1 values, $\mathbf{C1}^2$ values, and $\mathbf{C2}^2$ values used to calculate the background color values;

a means for comparing the background color value and pixel color values of pixels representing at least a portion of the original document to determine a difference between the background color value and the pixel color values of the compared pixels; and a means for altering the pixel color values based on the difference.

3. The copier according to claim 2 wherein the means for determining the background color value of the original document is a MIC module, and the means for comparing the background color with the pixel color values, and for altering the pixel color values is a RTE module.

4. The copier according to claim 2 further including a statistics module used to obtain statistics of the pixel stream, which are used to determine the background color.

5. The copier according to claim 2 wherein the scanned pixels are generated in an RGB color space environment.

6. The copier according to claim 5 further including a color space conversion module which converts the pixels represented in the RGB color space into a luminance/chrominance color space.

7. The copier according to claim 6 wherein the pixels in the luminance/chrominance color space are represented by a C0 component representing pixel luminance, and C1 and C2 components representing pixel chrominance.

8. A method for removing background noise in a document to be reproduced by a copier, the steps comprising:

scanning an original document to generate a stream of pixels in a RGB color space by use of a scanner, each pixel being represented by a pixel value;

converting the RGB color space pixel value of the pixels in the pixel stream into a luminance/chrominance color space, by a color space converter;

collecting statistical data of the pixel values connected to the luminance/chrominance color space;

developing a histogram of the pixel values based on the collected statistical data;

determining a background color value of the original document based on at least one of the histogram and collected statistical data or based on predetermined default values;

comparing the background color value to at least some of the pixel values of the pixel stream to determine a color distance each of the compared pixel values are from the background color value;

determining whether the color distance of each pixel is far, near or intermediate from the background color value;

adjusting the pixel values of the compared pixels based on whether the pixel value is near, far or intermediate; and, reproducing the original document using the adjusted pixel values.

9. The method according to claim 8 further including:

generating a Cref value representing a reference value of the background color value;

forming a three dimensional inner ellipse around the Cref value;

forming a three dimensional outer ellipse, larger than the inner ellipse, around the Cref value, wherein pixels of the pixel stream having pixel values located within the inner ellipse are considered near, pixels with pixel values outside the outer ellipse are considered far, and pixels with pixel values outside the inner ellipse and inside the outer ellipse are considered intermediate.

10. The method according to claim 9 further including:

stretching a C0 value, representing a luminance value of a pixel, of a near pixel to the background color value;

stretching a C0 value of an intermediate pixel by a linear value; and, maintaining the C0 value of a far pixel.

11. The method according to claim 10 wherein the step of comparing the background color value to at least some of the pixel values of the pixel stream to determine the color distance includes determining a three dimensional color distance.

12. The method according to claim 8 wherein the noise removal is accomplished on a single pass of the scanner.

13. The method according to claim 8 wherein when the background color value is determined to represent a color of a predetermined dark level, further including the steps of:

changing the pixel values of near pixels to pixel values representing a substantially white color value.

14. The method according to claim 8 wherein the step of determining the background color value includes:

reviewing bins of the histogram; and, selecting a brightest region of the histogram.

15. The method according to claim 8 wherein the step of converting to the luminance/chrominance color space includes representing each pixel in the luminance/chrominance color space with a C0 value representing luminance, and C1 and C2 values representing chrominance of the pixel.

16. The method according to claim 8 wherein the step of developing the histogram includes counting a number of occurrences of the C0 value for each of the scanned pixels.

17. The method according to claim 16 wherein the step of determining the background color further includes:

selecting the brightest area of the histogram.

* * * * *